United States Patent
Fukuda et al.

(10) Patent No.: US 7,064,863 B2
(45) Date of Patent: Jun. 20, 2006

(54) METHOD AND SYSTEM FOR SEE-THROUGH IMAGE CORRECTION IN IMAGE DUPLICATION

(75) Inventors: Hiroaki Fukuda, Kanagawa (JP); Yuji Takahashi, Kanagawa (JP); Hiroyuki Kawamoto, Kanagawa (JP); Rie Ishii, Tokyo (JP); Hideto Miyazaki, Kanagawa (JP); Shinya Miyazaki, Tokyo (JP); Sugitaka Oteki, Tokyo (JP); Takeharu Tone, Tokyo (JP); Fumio Yoshizawa, Kanagawa (JP); Yoshiyuki Namizuka, Kanagawa (JP); Yasuyuki Nomizu, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 846 days.

(21) Appl. No.: 09/847,192

(22) Filed: May 2, 2001

(65) Prior Publication Data
US 2001/0050778 A1    Dec. 13, 2001

(30) Foreign Application Priority Data
May 8, 2000    (JP)    ............................. 2000-134123

(51) Int. Cl.
*G06F 15/00* (2006.01)
*H04N 1/00* (2006.01)

(52) U.S. Cl. ................... 358/1.9; 358/3.26; 358/462

(58) Field of Classification Search ............ 358/1.9, 358/3.26, 3.27, 462, 426
See application file for complete search history.

(56) References Cited

U.S. PATENT DOCUMENTS 5,832,137 A * 11/1998 Knox ..................... 382/275
5,949,964 A * 9/1999 Clouthier et al. ............ 358/3.06
5,977,978 A * 11/1999 Carey et al. ................ 345/419
6,285,470 B1 * 9/2001 Matsuda et al. ............. 358/474

FOREIGN PATENT DOCUMENTS

| JP | 6-14185 | 1/1994 |
|----|---------|--------|
| JP | 9-116753 | 5/1997 |
| JP | 9-186836 | 7/1997 |

* cited by examiner

Primary Examiner—Thomas D. Lee
Assistant Examiner—James A. Thompson
(74) Attorney, Agent, or Firm—Knoble Yoshida & Dunleavy, LLC (57) ABSTRACT

To solve problems associated with undesirable duplication of see-through back image in a double-sided input document, a method of and a system for substantially eliminating the undesirable see-through back images initially scanns a front side image and a back side image from the double-sided document and store the scanned images. The front side image has portions, and some of the portions include an original front image as well as a see-through back image from the back side image. An edge amount for each of the portions is determined in the front side image. The see-through back images are separated from the original front images based upon the edge amount. To further improve the correct removal of the undesired see-through back image, the above processed portions having a certain edge are smoothed. Character portions and dot pattern portions are further separated from background portions in the smoothed data. Finally, the intensity level of the character portions, the dot pattern portions and the background portions are adjusted by a corresponding predetermined conversion function so as to substantially eliminate the see-through back image.

18 Claims, 11 Drawing Sheets

FIG. 7A — FRONT IMAGE
FIG. 7B1 — BACK IMAGE (DOT PATTERN)
FIG. 7B2 — BACK IMAGE (CHARACTER)
FIG. 7B3 — BACK IMAGE (THICK)

FIG. 8

$$L1 = \begin{bmatrix} -1 \\ -1 + 4 - 1 \\ -1 \end{bmatrix}$$

FIG. 10B $$L2 = \begin{bmatrix} 1 & 1 & 1 & 1 & 1 \\ 1 & 1 & 1 & 1 & 1 \\ 1 & 1 & 2 & 1 & 1 \\ 1 & 1 & 1 & 1 & 1 \\ 1 & 1 & 1 & 1 & 1 \end{bmatrix} \times 1/26$$

FIG. 13A    BINARIZATION

FIG. 13B    FOUR PIXEL ENLARGEMENT

FRONT DOT PATTERN DETECTION

FIG. 17B

FRONT IMAGE AFTER REMOVING SEE-THROUGH BACK IMAGE

FIG. 18A

DOT PATTERN IMAGE

FIG. 18B

SEE-THROUGH BACK IMAGE

METHOD AND SYSTEM FOR SEE-THROUGH IMAGE CORRECTION IN IMAGE DUPLICATION

FIELD OF THE INVENTION

The current invention is generally related to an image duplication technique, and more particularly related to a method of and a system for correcting a see through image on a semi-transparent image-carrying medium.

BACKGROUND OF THE INVENTION

As disclosed in Japanese Patent Office Publication (JPOP) 09-186836, an image duplication device such as a digital photocopier utilizes digital data. The digital photocopier scans an input document and generates analog image data. The digital copier converts the analog scanner output data into output digital data format and stores it in a frame memory. Then, the digital copier outputs the digital image from the frame memory to a printer engine in order to generate a reproduction image. Alternatively, the digital photocopier stores the above digital data in a secondary memory unit such as a floppy disk or a hard disk, and at a later output time, the digital photocopier outputs the stored digital image data from the secondary memory storage unit to a printer engine. Similarly, the digital photocopier processes the stored digital image data into a print image signal in a frame memory while accessing font information in response to a print command from a terminal device such as a personal computer via LAN, serial interface and or parallel interface. The digital photocopier ultimately sends the processed image data to the printer engine.

In duplicating an image scanned from an input document, a digital photocopier scans a document that has printed information on both front and back of the page. It is possible to see through some dark image from the other side of a document since some image-carrying medium such as paper is semi-transparent. When a digital photocopier scans an image from one side of a double-sided document, a see-through image from the other side is sometimes undesirably scanned together. In order to avoid the see-through image, one exemplary prior art reference such as JPOP06-14185 discloses an image processing device determines a see-through image based upon an image intensity level histogram. The prior art image processing further utilizes the intensity value of the scanned see-through image portion as a color background to correct the see-through image area. Another exemplary prior art reference such as JPOP9-116753 discloses an image processing device that reads a predetermined see-through image on a certain image-carrying medium and cancels any see-through image from input image data.

Despite the above described prior art techniques, the see-through image problem remains to be improved. For example, when a see-through image is considered as a color background, and the intensity level is corrected as disclosed in JPOP06-14185, the gradation is sacrificed. A corrected output image cannot reproduce any image portion having an intensity level that is lower than that of the see-through image portion and lacks the accuracy. Furthermore, since the correction method is a discontinuous intensity correction, the output image has non-smooth appearance. Similarly, the cancellation method as disclosed in JPOP9-116753 also fails to produce a desirable image since the dynamic range of the image is limited. The current invention is directed to solve these and other problems related to the see-through images during image duplication.

SUMMARY OF THE INVENTION

In order to solve the above and other problems, according to a first aspect of the current invention, a method of substantially eliminating the undesirable see-through back image problem in duplicating double-sided documents, including: scanning a front side image and a back side image from the double-sided document, the front side image having portions, some of the portions including an original front image and a see-through back image from the back side image; storing the front side image and the back side image; determining an edge amount for each of the portions in the front side image; initially separating the see-through back image from the original front image based upon the edge amount to generate a first process result; smoothing the portions having a certain amount of the edge amount in the first process result to generate a smoothed result; further separating character portions and dot pattern portions from background in the smoothed result to leave background portions; and correcting an intensity level of the character portions, the dot pattern portions and the background portions using a corresponding predetermined conversion function so as to substantially eliminate the see-through back image.

According to a second aspect of the current invention, a system for substantially eliminating the undesirable see-through back image problem in duplicating double-sided documents, including: a scanner for scanning a front side image and a back side image from the double-sided document, the front side image having portions, some of the portions including an original front image and a see-through back image from the back side image; a memory unit connected to the scanner for storing the front side image and the back side image; an edge amount determination unit connected to the memory unit for determining an edge amount for each of the portions in the front side image; a smoothing unit connected to the edge amount determination unit and the memory unit for smoothing the portions having a certain amount of the edge amount in the first process result to generate a smoothed result; a determination unit connected to the edge amount determination unit and the smoothing unit for initially separating the see-through back image from the original front image based upon the edge amount to generate a first process result, the determination unit further separating character portions and dot pattern portions from background in the smoothed result to leave background portions; and a correction unit connected to the determination unit for correcting an intensity level of the character portions, the dot pattern portions and the background portions using a corresponding predetermined conversion function so as to substantially eliminate the see-through back image.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

FIGS. 7B1, 7B2 and 7B3 are graphs respectively illustrating back image data.

DETAILED DESCRIPTION OF THE PREFERRED EMBODIMENT(S)

Figure 1:
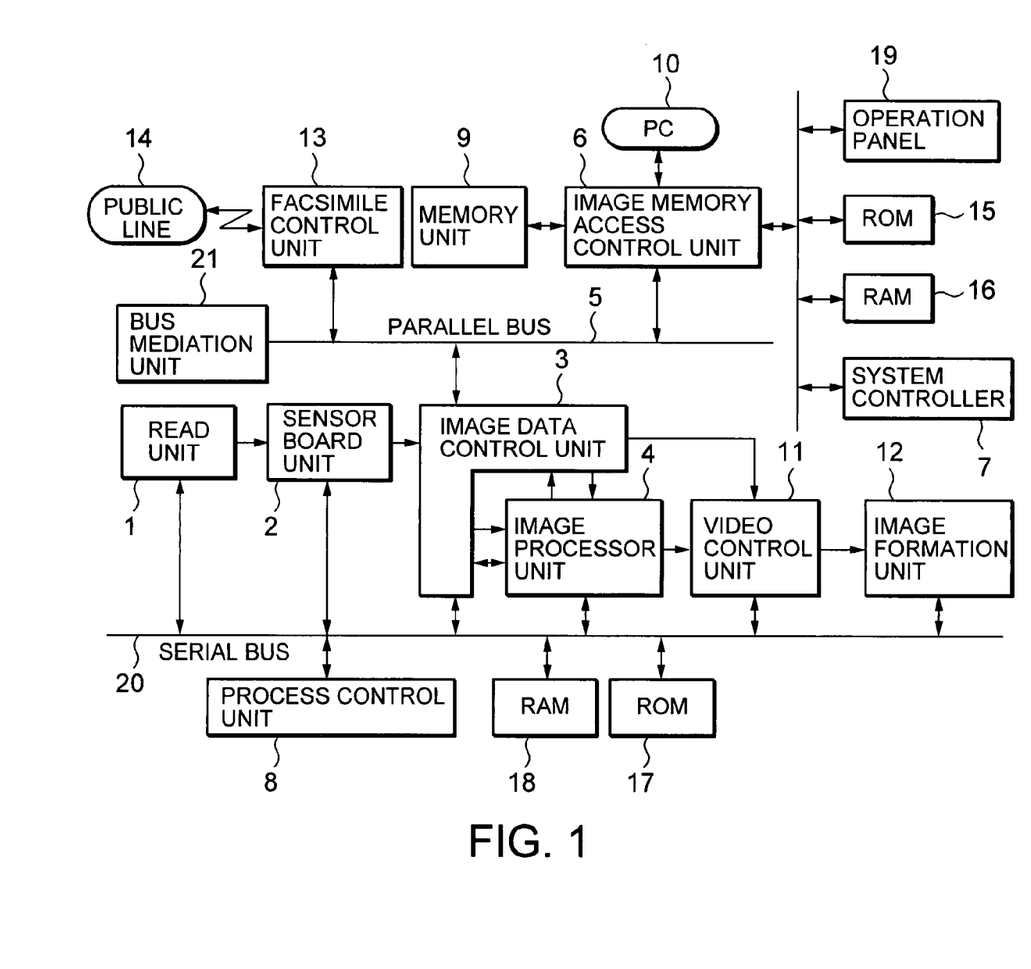
FIG. 1 is a block diagram illustrating one preferred embodiment of the digital photocopier according to the current invention.

Referring now to the drawings, wherein like reference numerals designate corresponding structures throughout the views, and referring in particular to FIG. 1, a block diagram illustrates one preferred embodiment of the digital photocopier according to the current invention. A scanner unit 1 of the digital photocopier projects light onto a document surface and optically reads characters and images by focusing the reflected light from the document surface onto a CCD via a group of mirrors and lenses. A sensor board unit 2 converts the front and back image signal from the CCD to digital signals and outputs the digital signals to an image data control unit 3. The image data control unit 3 controls the data transfer among an image process unit 4, a parallel bus 5 and an image memory access control unit 6. The image data control unit 3 also controls the entire system controls such as communication between a system control unit 7 and a process control unit 8. The process control unit 8 controls various processes that act on the image data. In general, the image data inputted into the image data control unit 3 is transferred to the image process unit 4, and the image process unit 4 corrects the signal degradation associated with the digitization and the optics. The image process unit 4 outputs back to the corrected image data to the image data control unit 3. In response, the image data control unit 3 transfers the corrected image data to the image memory access control unit 6 via the parallel bus 5. The image memory access control unit 6 controls the transferred corrected image data and the memory access of a memory unit 9 under the control of the system control unit 7. In addition, the image data control unit 3 processes the data from an external personal computer 10 for printing as well as compresses or decompresses the image data for the efficient storage in the memory unit 9. The image memory access control unit 6 reads the front and back compressed image data from the memory unit 9 for printing and decompresses the image data back to the original image data which is transferred to the image data control unit 3 via the parallel bus 5.

Still referring to FIG. 1, upon receiving the front and back image data from the image memory access control unit 6, the image data control unit 3 outputs the above image data as output image data to the image process unit 4. The image process unit 4 corrects see-through image by referring to the front image and the back image and outputs the corrected image data to a video data control unit 11. In turn, the video control unit 11 performs a predetermined pulse control on the output image data and transfers the processed image data to an image formation unit or a printer engine 12 for forming a reproduced image on an image-carrying medium.

If the scanned image data is to be faxed, the scanned data is transferred from the image data control unit 3 to the image process unit 4, where the image data is processed as described. The processed image data is now transferred from the image process unit 4 to a facsimile control unit 13 via the parallel bus 5. The facsimile control unit 13 performs a predetermined data conversion on the processed image data before transferring to a communication network and outputs the converted image data as facsimile data on a public network 14. Conversely, the facsimile control unit 13 converts the facsimile data from the public network 14 into the predetermined image data and sends the image data to the image process unit 4 via the parallel bus 5 and the image data control unit 3. In case of the facsimile transmission, the image process unit 4 does not perform any special process and transfers the image data to the video data control unit 11. In turn, the video control unit 11 performs a predetermined pulse control and a predetermined dot rearrangement on the output image data and transfers the processed image data to an image formation unit or a printer engine 12 for forming a reproduced image on an image-carrying medium.

Under the circumstances where the above described multiple output jobs such as copying, faxing and printing or associated processes are taking place in parallel, the system control unit 7 along with ROM 15 and RAM 16 controls the entire system by allocating the resources. Similarly, the process control unit 8 along with ROM 17 and RAM 18 controls the flow of the image data. An operation panel 19 inputs a selection from the above described various jobs. The system control unit 7 and the process control unit 8 communicate with each other via the parallel bus 5, a serial bus 20 and the image data control unit 3. The image data control unit 3 converts the data format for interfacing between the parallel bus 5 and a serial bus 20. A bus control unit of a bus mediation unit 21 mediates the right to use the parallel bus 5 in case of simultaneous multiple bus requests.

In the following, the more detail description is provided for the image data control unit 3, the image-process unit 4, the image memory access control unit 6, the video data control unit 11 and the facsimile control unit 13 of a multi-functional digital image reproduction device.

Figure 2:
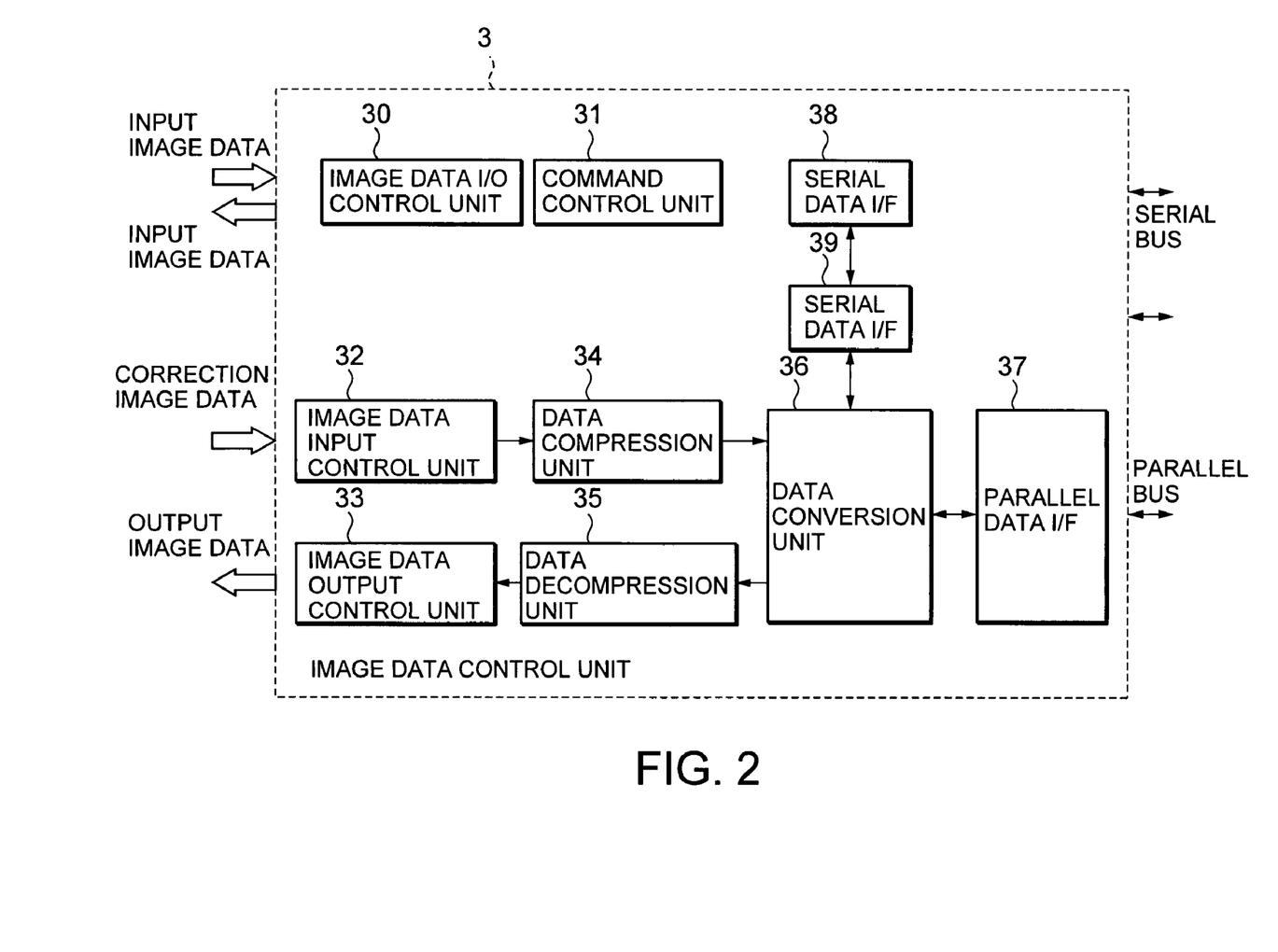
FIG. 2 is a block diagram illustrating one preferred embodiment of the image data control unit according to the current invention.

Now referring to FIG. 2, a block diagram illustrates one preferred embodiment of the image data control unit 3 according to the current invention. The image data control unit 3 further includes an image data input/output (I/O) control unit 30, a command control unit 31, an image data input control unit 32, an image data output control unit 33, a data compression unit 34, a data decompression unit 35, a data conversion unit 36, a serial data interface (I/F) unit 38, 39 and a parallel data interface (I/F) unit 37. The scanned image data from the sensor board unit 2 is inputted to the image data I/O control unit 30 and is further outputted from the image data I/O control unit 30 to the image process unit 4. The image process unit 4 corrects the image data and outputs the corrected image data to the data compression unit 34 via the image data input control unit 32. In order to increase the transfer rate in the parallel bus 5, the data compression unit 34 compresses the image data, and the data conversion unit 36 outputs the converted image data to the parallel bus via the parallel data I/F unit 37. In the other direction, the compressed data is sent to the data decompression unit 35 via the parallel data I/F unit 37 and the data conversion unit 36. After the image data is decompressed in the data decompression unit 35, the image data output control unit 33 outputs the decompressed image data to the image process unit 4. The data conversion unit 36 interchangeably converts both the serial data and the parallel data for communication between the system control unit 7 and the process control unit 8. The two tier serial data I/F units 38 and 39 control communication between the image process unit 4 and the serial bus 20.

Figure 3:
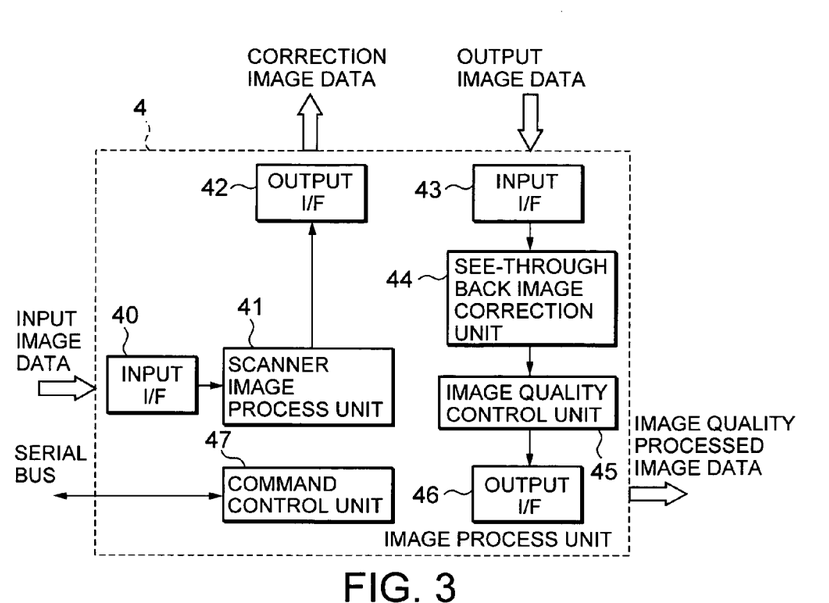
FIG. 3 is a block diagram illustrating components of one preferred embodiment of the image process unit according to the current invention.

Now referring to FIG. 3, a block diagram illustrates components of one preferred embodiment of the image process unit 4 according to the current invention. The image process unit 4 further includes a first input interface (I/F) unit 40, a scanner image process unit 41, a first output I/F unit 42, a second input I/F unit 43, a see-through back image correction unit 44, an image quality control unit 45, a second output I/F unit 46 and a command control unit 47. The scanned image data from the image data control unit 3 is inputted to the first input I/F unit 40 and is further outputted from the first input I/F unit 40 to the scanner image process unit 41. The scanner image process unit 41 processes the image data by shade correction, scanner γ correction, MTF correction as well as enlargement/reduction. The scanner image process unit 41 outputs the corrected image data to the image data control unit 3 via the first output I/F unit 42. The output image data from the image data control unit 3 is inputted to the second input I/F unit 43 and is further outputted from the second input I/F unit 43 to the see-through back image correction unit 44. After the see-through correction, the see-through back image correction unit 44 outputs the corrected image data to the image quality control unit 45. The image quality control unit 45 processes the image data by an area gradation process and outputs the processed image data to the video control unit 11 via the second output I/F unit 46. The area gradation process in the image quality control unit 45 includes an intensity level conversion, a dithering process and an error diffusion process, and a major process is an area approximation of gradation information. The command control unit 47 controls the process flow among the scanner image process unit 41, the see-through back image correction unit 44 and the scanner image process unit 41.

The memory unit 9 stores the corrected image data that has been processed by the scanner image process unit 41, and the scanner image process unit 41 processes the stored data in various manners to generate print image data. For example, by changing a number of lines in the dither matrix or an intensity level of the reproduced image, the appearance of the reproduced image is modified. As described above, it is not necessary to read the image data from the scanning unit 1 every time the process is modified, but the stored image data is read from the memory unit 9. The same image data is reused for various image processing.

Figure 4:
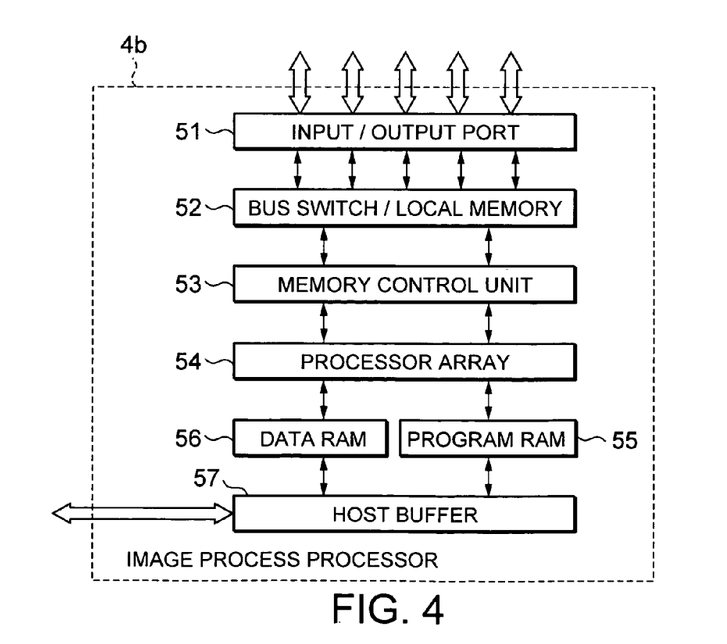
FIG. 4 is a block diagram illustrating another preferred embodiment of the image process unit according to the current invention.

Now referring to FIG. 4, a block diagram illustrates another preferred embodiment of the image process unit 4 according to the current invention. The image process unit 4b further includes a plurality of input/output (I/O) ports 51 for inputting and outputting data to and from the external devices; bus switches/local memory units 52; a memory control unit 53 for controlling memory areas and data paths that the bus switches/local memory units 52 utilize; a processor array 54 for processing the image data stored in the switches/local memory units 52 and for storing the processed image data back in the switches/local memory units 52; a program RAM 55 for storing parameters used for processing by the processor array 45; a data RAM 56 and a host buffer unit 57.

Figure 5:
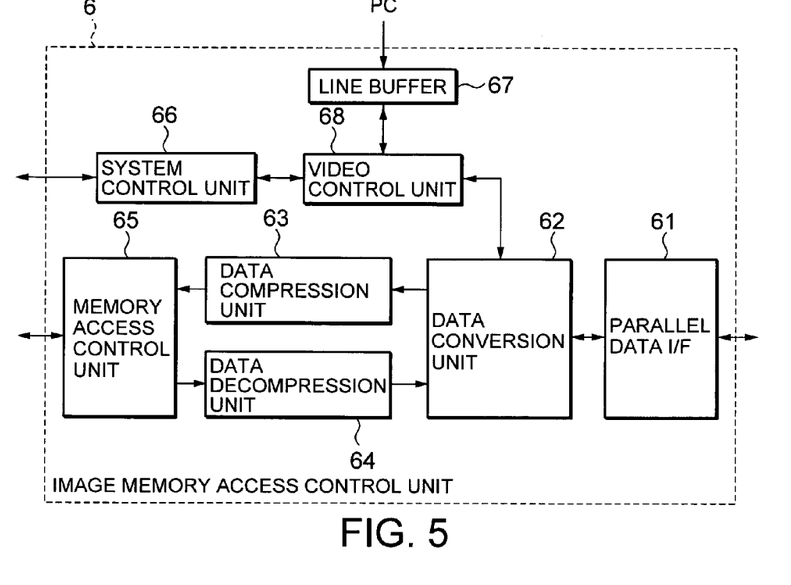
FIG. 5 is a block diagram illustrating one preferred embodiment the image memory access control unit according to the current invention.

Now referring to FIG. 5, a block diagram illustrates one preferred embodiment the image memory access control unit 6 according to the current invention. The image memory access control unit 6 further includes a parallel data interface (I/F) unit 61, a data conversion unit 62, a data compression unit 63, a data decompression unit 64, a memory access control unit 65, a system control unit 66, a line buffer unit 67 and a video control unit 68. The code data from an external personal computer 10 is stored in a local area in the line buffer 67, and the video control unit 68 process the code data into image data based upon a process command from the system control unit 7 via the system control unit 66. The above processed image data and image data in the parallel data I/F unit 61 from the image data control unit 3 via the parallel bus 5 are then stored in the memory unit 9. The data conversion unit 62 selects the image data, and the data compression unit 63 compresses the selected image data for efficient storage. The memory access control unit 65 stores the compressed image data in the memory unit 9 while the memory access control unit 65 keeps track of the address in the memory unit 9. To read the stored data from the memory unit 9, the memory access control unit 65 specifies a read begin address. The data decompression unit 64 decompresses the image data that have been read from the memory unit 9, and the data conversion unit 62 transfers the converted data to the parallel bus 5 via the parallel data I/F unit 61.

Figure 6:
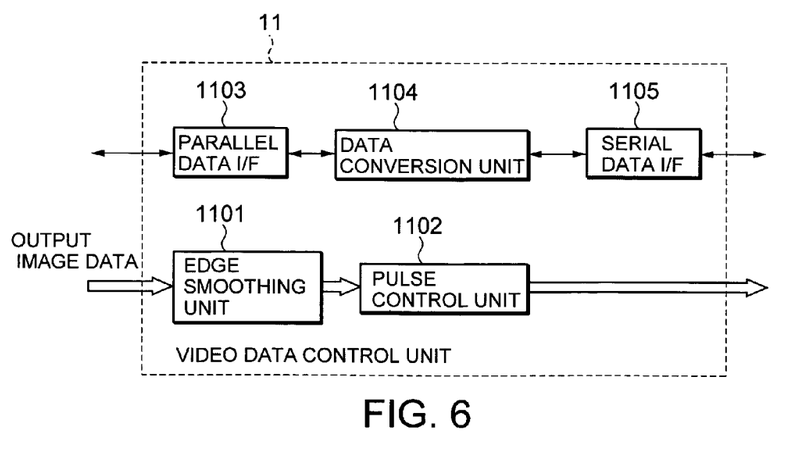
FIG. 6 is a block diagram illustrating one preferred embodiment the video control unit according to the current invention.

Now referring to FIG. 6, a block diagram illustrates one preferred embodiment the video control unit 11 according to the current invention. In general, the video data control unit 11 further processes the output image data from the image process unit 4 according to the characteristics of the image formation unit 12. The video data control unit 11 further includes an edge smoothing process unit 1101, a pulse control unit 1102, a parallel data interface (I/F) unit 1103, a data conversion unit 1104 and a serial data interface (I/F) unit 1105. The edge smoothing process unit 1101 processes the output image data from the image process unit 4b for rearranging dots, and the pulse control unit 1102 performs the pulse control process on the edge smoothed data for forming dots. The pulse control unit 1102 subsequently outputs the processed image data to the image formation unit 12. In addition to the above output data conversion, the data conversion unit 1104 converts the format of serial data from the serial data I/F unit 1105 and parallel data from the parallel data I/F unit 1103. The video data control unit 11 alone manages the communication between the system control unit 7 and the process control unit 8.

The above described digital copier sends the image data scanned from the front side of the document by the scanner unit 1 to the sensor board unit 2, the image data control unit 3 and the image process unit 4 in this order. The image data is stored in stored in the memory unit 9 via the image data control unit 3, the parallel bus 5 and the image memory access control unit 6. When the image data is outputted from the memory unit 9, the image data is first sent to the image data control unit 3 via the parallel bus 5 and the image memory access control unit 6. Subsequently, the image data is sent from the image data control unit 3 to the image formation unit 12 to form a transfer image via the image process unit 4 and the video data control unit 11.

As described above, the scanner 1 reads the front and back of a document, and the image data is stored in the memory unit 9. When the scanned image data is outputted from the memory unit 9, the image memory access control unit 6 reads the front side image data in the same order as it has been scanned. On the other hand, when the back side image data is outputted from the memory unit 9, the image memory access control unit 6 reads the back side image data in such manner that the back side image is seen through the front side. In other words, the back side image data is read as if their positions corresponding to the front side image data are reversed in the left and right direction. The above described front and back side image data from the image memory access control unit 6 are sent to the image process unit 4 via the image data control unit 3. The see-through back image correction unit 44 corrects the front and back image data from the image process unit 4.

Referring to FIGS. 7, a graph illustrates one exemplary image data to be sent to the see-through back image correction unit 44. FIG. 7A is a graph illustrating exemplary front image data 81 while FIGS. 7B1, 7B2 and 7B3 are graphs respectively illustrating back image data 82a, 82b and 82c. The front image data 81 includes the image data representing an image printed on the front side as well as a see-through back image that is seen on the front side through the semi-transparent document. Similarly, the back image data includes the image data representing an image printed on the back side as well as a see-through front image that is seen through the back side through the semi-transparent document. The back image data 82a, 82b and 82c respectively represent a dot pattern image, a character portion image and a graphic portion image. The X axis and the Y axis in these graphs respectively represent positions and image data values. The higher the X value is, the darker the image appears.

Figure 8:
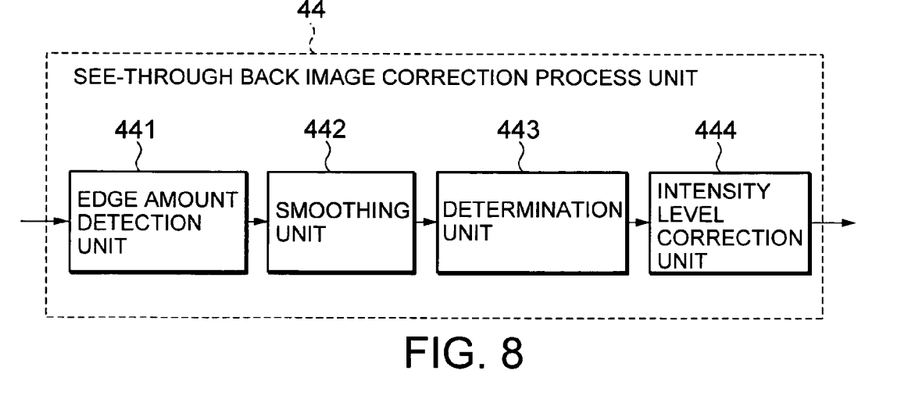
FIG. 8 is a block diagram illustrating one preferred embodiment of the see-through back image correction process unit according to the current invention.

Referring to FIG. 8, a block diagram illustrates one preferred embodiment of the see-through back image correction process unit 44 according to the current invention. The see-through back image correction process unit 44 further includes an edge amount detection unit 441, a smoothing unit 442, a determination unit 443 and an intensity level correction unit 444. The edge amount detection unit 441 extracts edge portions of the output image data. The smoothing unit 442 smoothes the edge extracted portions while the determination unit 443 isolate the see-through image portions from the original front image portions based upon the binarized data that has been generated according to a predetermined threshold value. The intensity level correction unit 444 thus removes the see-through portions in the output image data based upon the results from the determination unit 443.

Figure 7A:
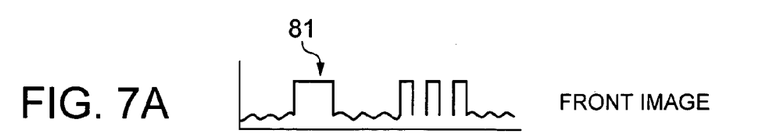
FIG. 7A is a graph illustrating exemplary front image data.
Figure 7B:
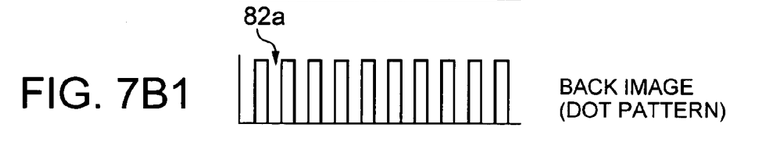
Figure 7B:
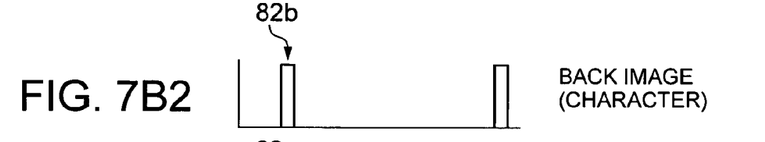
Figure 7B:
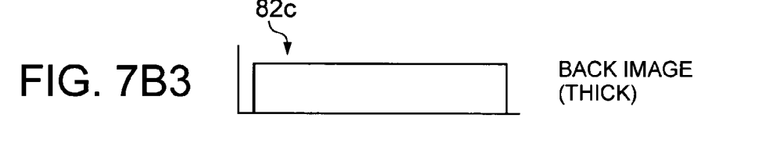
Figure 9:
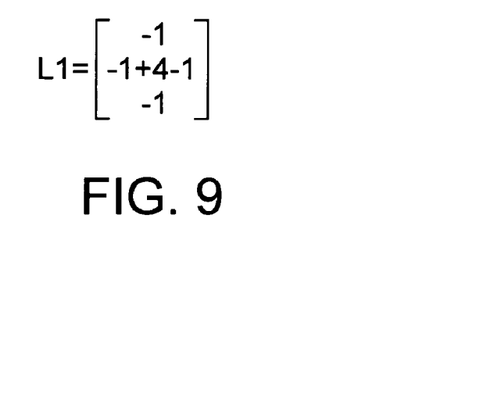
FIG. 9 illustrates an exemplary filter L1.
Figure 10A:
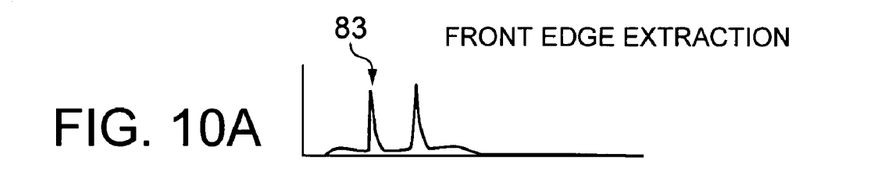
FIG. 10A is a graph illustrating the edges as represented by peaks.

As described above, the edge amount detection unit 441 extracts edge portions of the output image data. For example, even though an image on the back side of a document is clear, edges of a see-though image is generally blurred as it is seen through the document. On the other hand, a low contrast print image such as a character portion and a dot pattern portion have sharp edges even if the average intensity level is low. Based upon the above distinction or characteristics of edges, an image is determined whether it is original or see-through. To detect the edges, for example, a filter L1 such as shown in FIG. 9 is applied to the front image 81 of the output image data as shown in FIG. 7A. Similarly, to detect the edges, the filter L1 is applied to the back side image data. As the result of the above described edge detection, FIG. 10A is a graph illustrating the edges as represented by peaks 83. By this detection method, the see-through image is separated from the edge portions of a low contrast image. However, when the edges 83 are determined by the above method, since inner portions of characters are not determined as edges, the character inner portions may be mistaken as see-through back image portions.

Figure 10B:
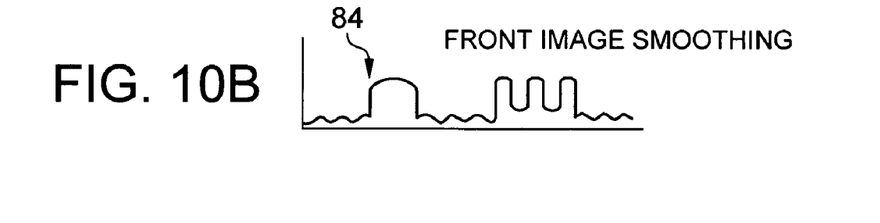
FIG. 10B is a graph that represents a smoothed image for an original front image as shown in FIG. 7A.
Figure 11:
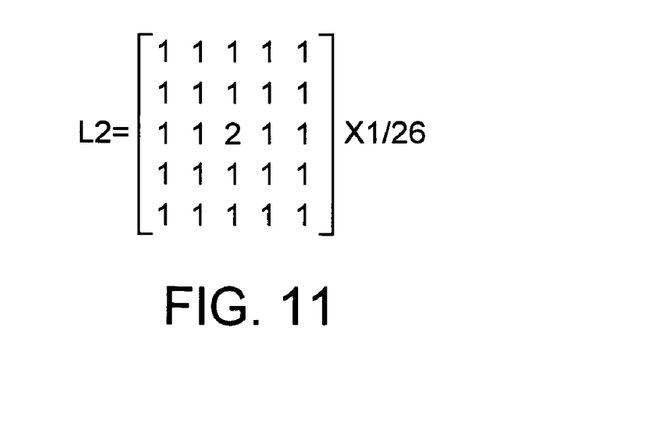
FIG. 11 illustrates an exemplary smoothing filter.

To avoid the above undesirable errors, the smoothing unit 442 smoothes the edge extraction results from the edge amount detection unit 441 by using a smoothing filter L2 such as shown in FIG. 11. FIG. 10B is a graph that represents a smoothed image 84 for an original front image 81 as shown in FIG. 7A. The determination unit 443 binarizes the smoothed image data according to a predetermined threshold value so as to isolate character portions and graphics portion in a low contrast image area. Subsequently, the intensity level correction unit 444 removes the undesirable see-through back image portions from the output image data based upon the extraction results from the determination unit 443 while it is referring to a gamma characteristic conversion line such as shown in FIG. 12.

Figure 12:
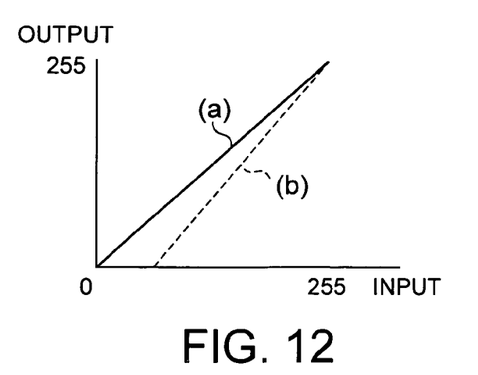
FIG. 12 illustrates an exemplary gamma characteristic conversion line.

FIG. 12 is a graph illustrates an exemplary input and output characteristics. The X axis indicates an input intensity value while the Y axis indicates an output intensity value. An intensity value from 0 signifying white to 255 signifying black. For character and dot pattern portions, input data is outputted without modifying by applying a linear $\gamma$ characteristics line (a) that goes through the origin. For other background portions, in order to remove portions below a predetermined threshold value, another linear γ characteristics line (b) is applied. By using a certain linear γ characteristics line, a desirably shaded front image is obtained after removing see-through back image portions. Subsequently, enlargement or reduction or image quality processes are performed before the image data is outputted to the video control unit 11. Finally, the image forming unit 12 prints out the image on an image-carrying medium. The above described method and devices substantially eliminate the undesirable see-through back image problem in duplicating two-sided documents.

Figure 13A:
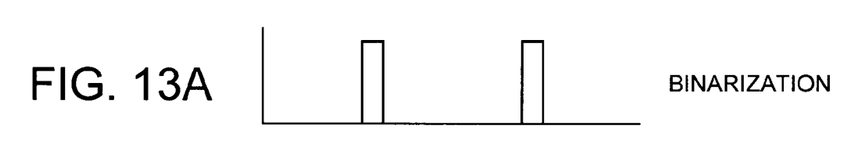
FIG. 13A is a graph depicting the edge detection data from the edge amount detection unit that has been binarized by the determination unit.
Figure 13B:
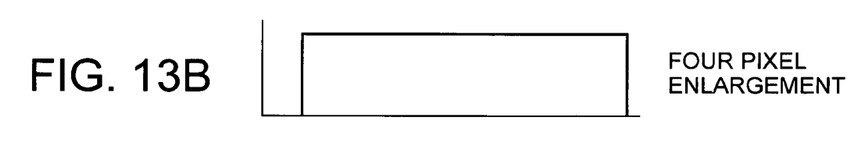
FIG. 13B depicts that the extracted edge portion is expanded to neighboring areas such as to four neighboring.

FIGS. 13A and 13B describe a second preferred process of substantially eliminating the undesirable see-through back image problem in duplicating two-sided documents according to the current invention. FIG. 13A is a graph depicting the edge detection data from the edge amount detection unit 441 that has been binarized by the determination unit 443. Since the above data allows only the extraction of the character edges, the extracted edge portion is expanded to neighboring areas such as to four neighboring pixels as shown in FIG. 13B. This expansion enables the extraction of inner areas of a character as well as dot pattern areas. By using the results from the improved extraction method, the intensity correction unit 444 removes the undesirable see-through back image areas while it is referencing to a gamma characteristic conversion table that is constructed from a gamma function such as shown in FIG. 12. Thus, the low contrast characters are not erroneously determined as a see-through back image.

Figure 14:
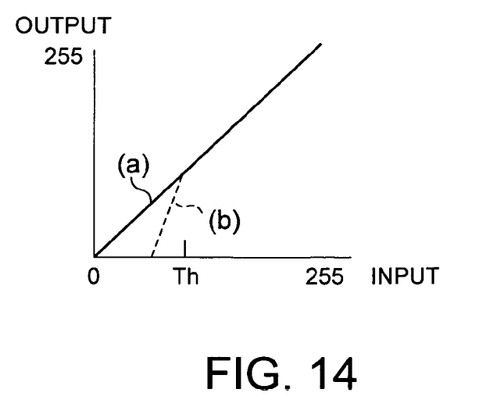
FIG. 14 describes a third preferred process of substantially eliminating the undesirable see-through back image problem in duplicating two-sided documents according to the current invention.

FIG. 14 describes a third preferred process of substantially eliminating the undesirable see-through back image problem in duplicating two-sided documents according to the current invention. The above described preferred processes utilize information on edge portions and non-edge portions to activate the see-through back image removal process. The above described preferred processes thus lower the intensity level of certain portions such inner portions of thick character lines based upon the gamma characteristic conversion table as shown in FIG. 12B. Consequently, an undesirable side effect is that certain dark portions are not completely filled at an original darkness. For these reasons, the third preferred process selects a technique based upon an intensity level of an original document to be duplicated. That is, when the intensity level of an input document is below a predetermined threshold value, even if a portion is a non-edge, the above described see-through back image removal process is not performed. For example, the predetermined threshold value depends upon the transparency of a certain standard thickness of a sheet of paper. When the intensity level of an input document exceeds the darkest intensity of a see-through back image, even if a portion is a non-edge, the portion is not determined as a see-through back image.

FIG. 14 is a graph depicting a gamma characteristic conversion curve to be used for the above described third preferred process. When the intensity level of an input document is below a predetermined threshold value, depending upon the detection of an edge, the third preferred process switches between the first gamma characteristics function (a) and the second gamma characteristics function (b). On the other hand, when the intensity level of an input document is above the predetermined threshold value, regardless of the presence of an edge, no gamma conversion is applied. Thus, third preferred embodiment performs the correction based upon the intensity level and prevents the duplicated image from having undesirably low intensity portions due to the see-through back image correction on non-edge high intensity portions.

In the graph of FIG. 14, the X axis is an input value range from 0 to 255, and The Y axis is an output value range from 0 to 255. While x is smaller than a predetermined threshold Th, for an edge portion, x=y. On the other hand, for a non-edge portion, y=(2x+Th). These two variables are used as a parameter in software implementation, and a SIMD processor can change a gamma curve in real time on a pixel basis.

Figure 15:
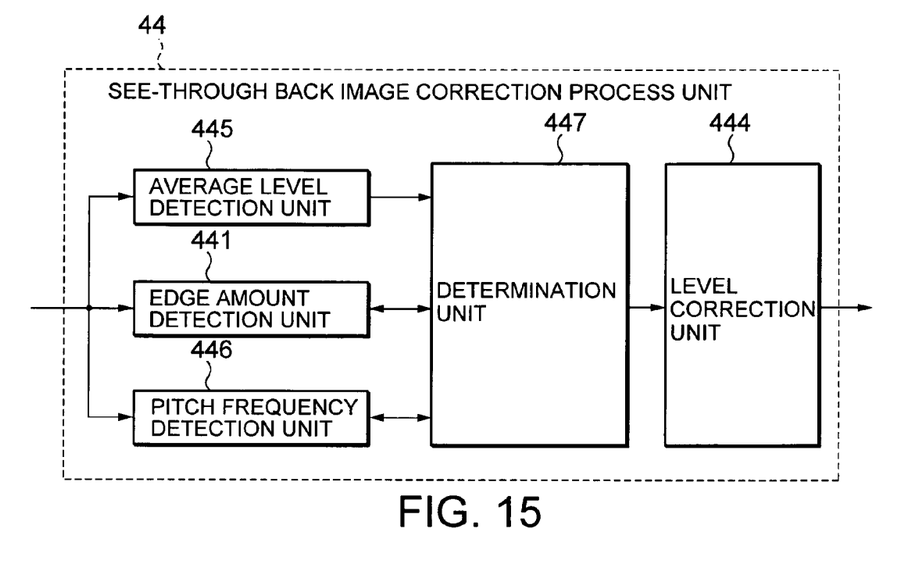
FIG. 15 is a diagram illustrating a fourth preferred embodiment for substantially eliminating the undesirable see-through back image problem in duplicating two-sided documents according to the current invention.

FIG. 15 is a diagram illustrating a fourth preferred embodiment for substantially eliminating the undesirable see-through back image problem in duplicating two-sided documents according to the current invention. The above described preferred processes utilize information on edge portions and non-edge portions to activate the see-through back image removal process. However, when the average intensity level is sufficiently high, there is no need to perform the see-through back image removal process. For example, when the input document is in color and has a low intensity dot pattern, since edges are not sufficiently detected by the filter L1 as shown in FIG. 9, it is difficult to separate front dot pattern images from see-through back images. The above separation is especially difficult when a yellow dot pattern document is scanned by a black-and-white scanner. In these cases, it is determined whether or not an image has a pitch frequency, and the determination enables to separate low intensity dot pattern images with weak edges from see-through back images.

Still referring to FIG. 15, the fourth preferred embodiment of the see-through back image correction unit 44 further includes an average level detection unit 445, an edge amount detection unit 441, a pitch frequency detection unit 446, a determination unit 447 and a level correction unit 444. The see-through back image correction unit 44 performs the see-through back image removal process on output image data when the output image has weak edges, no pitch frequency and has an average intensity level that is smaller than a predetermined value.

Figure 16:
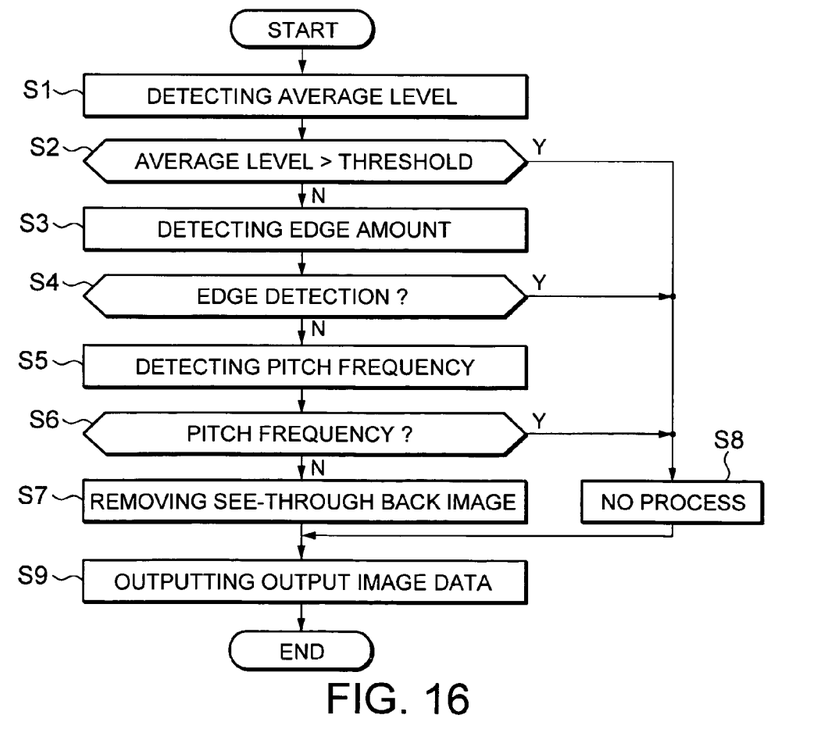
FIG. 16 is a flow chart illustrating steps involved in a preferred process of substantially eliminating the undesirable see-through back image problem in duplicating two-sided documents according to the current invention.

Referring to FIG. 16, a flow chart illustrates steps involved in a preferred process of substantially eliminating the undesirable see-through back image problem in duplicating two-sided documents according to the current invention. The preferred process includes step S1 of determining an average intensity level. For example, as FIG. 7A shows, after a front image 81 of output image data is sent to the see-through back image correction unit 44, the average level detection unit 445 determines an average intensity value and sends it to the determination unit 447. In step 2, the determination unit 447 compares the average intensity value to a predetermined threshold value. When the average intensity value is larger than the threshold value, the preferred process proceeds to step 8, where no process is performed. The determination unit 447 generates no see-through back image removal signal and sends the output image data to the level correction unit 444. Upon receiving no see-through back image removal signal and the output image data, the level correction unit 444 outputs the output image without performing the see-through back image removal process. On the other hand, when the average intensity value is smaller than the threshold value, the preferred process proceeds to step 3. The determination unit 447 generates a signal indicative of the small average intensity value and sends it to the edge amount detection unit 441.

Figure 17A:
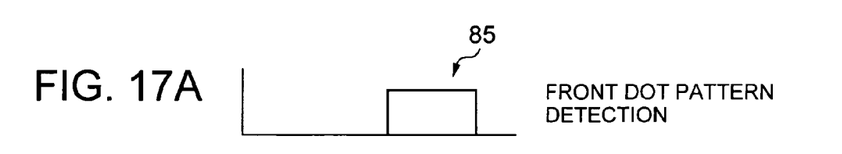
FIG. 17A is a graph illustrating a front dot pattern image.
Figure 17B:
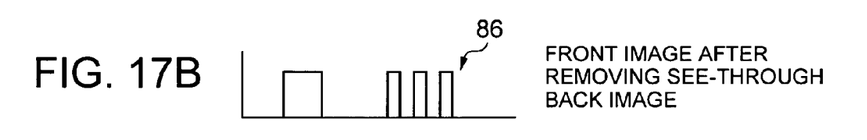
FIG. 17B is a graph illustrating a front dot pattern image after removing a see-through back image.

Still referring to FIG. 16, upon receiving the small average intensity signal, the edge amount detection unit 441 determines an edge amount of the output image data and sends it to the determination unit 447 in the step 3. The determination unit 447 determines in step 4 that the output image data represents an original front image when the detected edge amount is sufficiently high and generates a front image signal. The determination unit 447 then sends the output image data and the front image signal to the level correction unit 444. In step 8, the level correction unit 444 outputs the output image without performing the see-through back image removal process. On the other hand, when the detected edge amount is not sufficiently high in step 4, the determination unit 447 generates a non-front image signal and sends it to the pitch frequency detection unit 446. In step 5, in response to the non-front image signal, the pitch frequency detection unit 446 detects the pitch frequency of the output image data and sends it to the determination unit 447. Based upon the pitch frequency, the determination unit 447 determines whether or not the output image indeed has the detected pitch frequency in step 6. When the determination unit 447 determines that the output image data has the detected pitch frequency and is a front dot pattern image as shown in FIG. 17A, the determination unit 447 generates a front dot pattern image signal 85 and sends it to the level correction unit 444. In response to the front dot pattern image signal, in the step 8, the level correction unit 444 outputs the output image without performing the see-through back image removal process. On the other hand, when the determination unit 447 determines that the output image data fails to have the detected pitch frequency, the level correction unit 444 performs the see-through back image removal process in step 7 and sends the removed see-through back image to the image quality control unit 45 in step 9. Thus, in the above steps, it is determined whether or not an image has a pitch frequency, and the determination enables to separate low intensity dot pattern images with weak edges from see-through back images so as to form a front image 86 as shown in FIG. 17B.

Figure 18A:
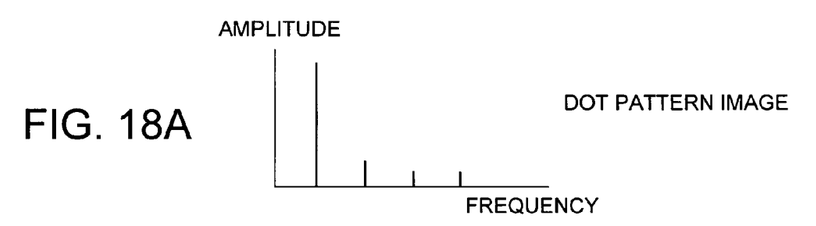
FIG. 18A illustrates an oscillation spectrum after the DTF is applied to a front image of an output image data.
Figure 18B:
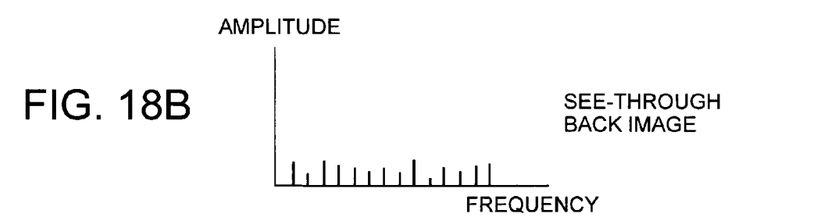
FIG. 18B illustrates an oscillation spectrum of a see-through back image.

The pitch frequency detection unit 446 performs the frequency analysis of an image based upon the distribution Fourier transformation (DFT) as well as determines a peak, a valley or a self-correlation function for the image. Based upon the above detections, the presence of a pitch frequency is determined. When the DFT is used for the frequency analysis, FIG. 18A illustrates an oscillation spectrum after the DTF is applied to a front image 81 of an output image data. FIG. 18B illustrates an oscillation spectrum of a see-through back image. Although the above DFT is two-dimensional DFT, FIGS. 18A and 18B illustrate only one dimension. As shown in FIG. 18A, a dot pattern image having a pitch frequency indicates clear spectrum peaks. In contrast, a see-through back image that does not have a pitch frequency fails to indicate spectrum peaks. Based upon the above spectrum peaks appearance, the dot patter image is distinguished from the see-through back image. For example, if an image signal and its DFT are respectively represented by x(m, n) and X(m, n), the oscillation spectrum is represented as |X (m, n)|. The max value, max |X(m, n)| is first determined. Equation (1) below shows that max |X (m, n)| is then normalized by the sum of the entire spectrum. If the above value is larger than or equal to a predetermined threshold value T, an image is determined to be a dot pattern image with a pitch frequency.

$$\frac{|X(m,n)|_{\max}}{\sum\limits_{m=0,n=0}^{M,N} |X(m,n)|} \geq T \qquad (1)$$

Figure 19A:
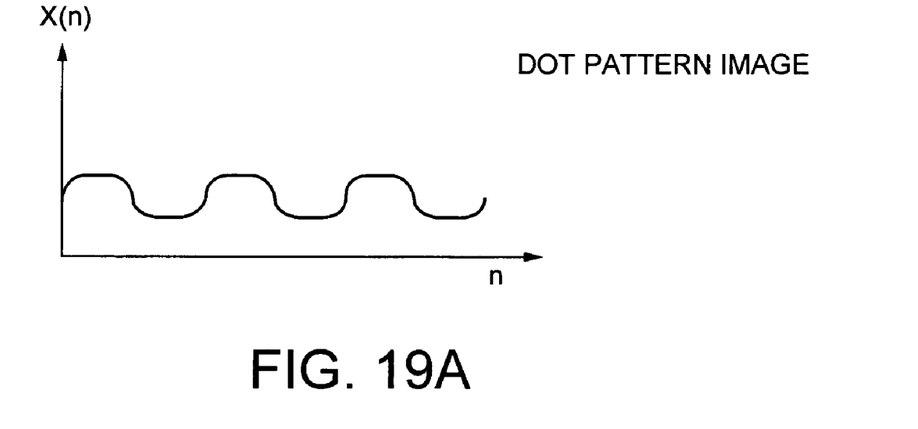
FIG. 19A diagrammatically illustrates the image data in the main scanning direction, and the same waveform periodically repeats for the front dot pattern image.
Figure 19B:
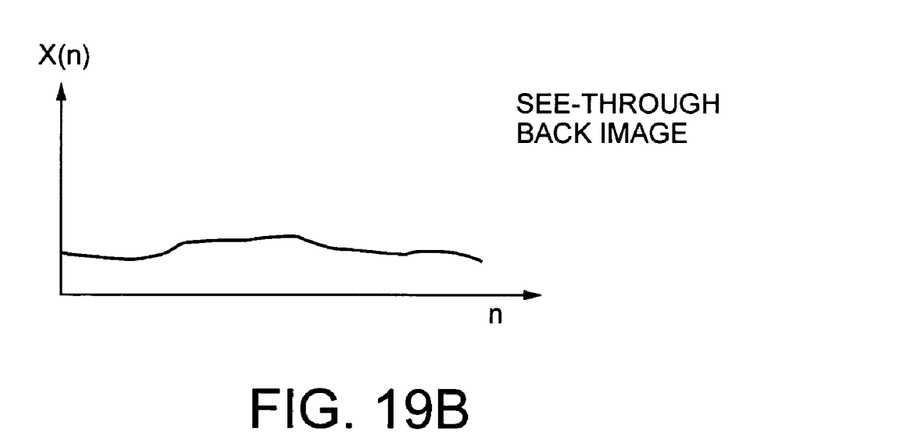
FIG. 19B is the same waveform which fails to periodically repeat for the see-through back image.

A self-correlation function is used to determine whether or not a pitch frequency exists. FIG. 19A diagrammatically illustrates the image data in the main scanning direction, and the same waveform periodically repeats for the front dot pattern image. On the other hand, as shown in FIG. 19B, the same waveform fails to periodically repeat for the see-through back image. Using the above distinction, the self correlation function $R_{xx}(m)$ is determined using the following equation (2) in order to separate the dot pattern image from the see-through back image.

$$R_{xx}(m) = \frac{1}{N-m} \sum_{n=1}^{N-1-m} x(n)x(n+m) \qquad (2)$$

$$(m = 0, 1, 2, \sim M)$$

In the equation (2), the data x (n+m) is the image data x(n) that is moved by m, and the sum of the product by x(n) is determined. In case of a dot pattern image that is expressed by the periodic wave form, the self correlation function, $R_{xx}(m)$ has a large value and x (n) and x (n+m) have the same wave form when the value of m matches a period of dot pattern. When the maximal value $R_{xx}(m)$ max is larger than a predetermined threshold value, an image is determined as a dot pattern image.

Figure 20:
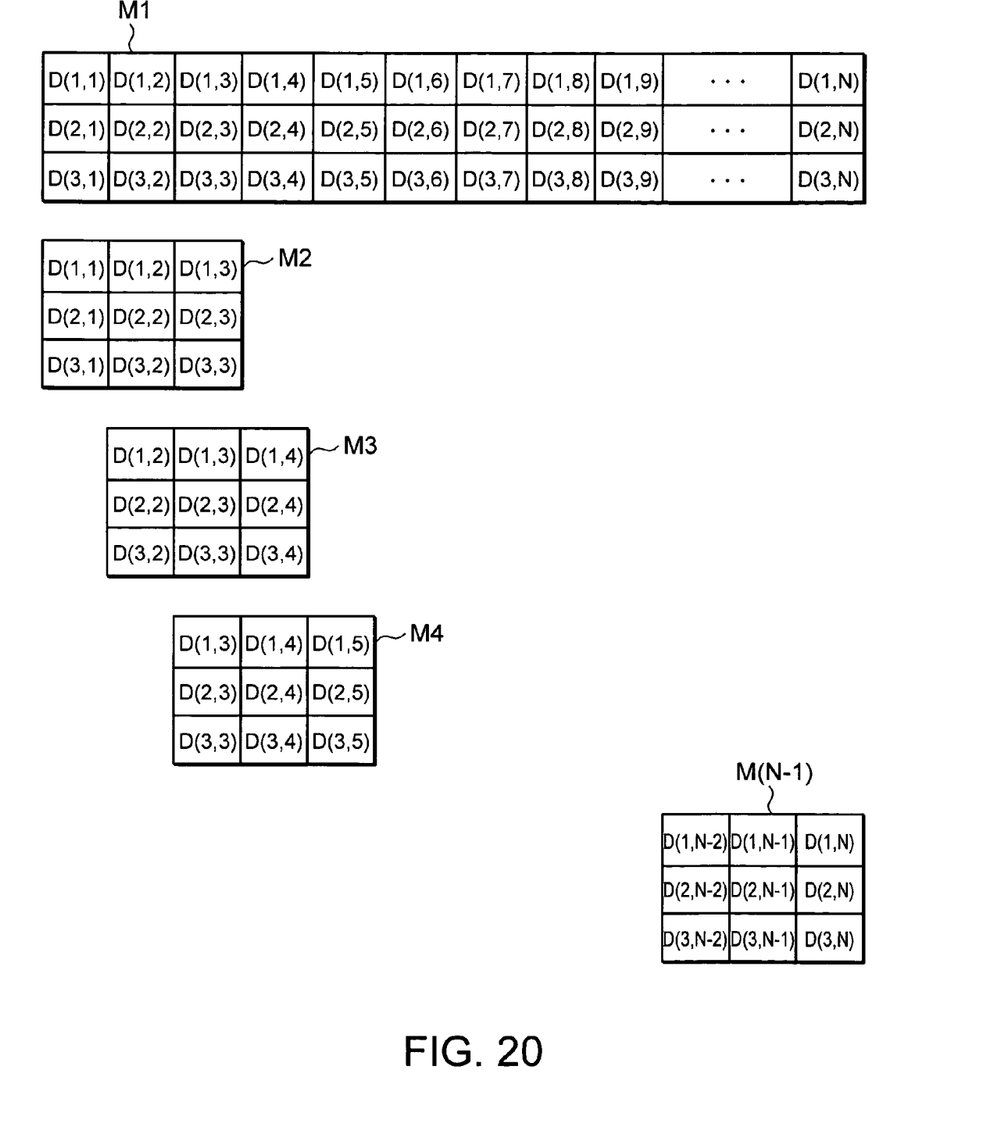
FIG. 20 is an N×3 pixel matrix for determining a peak and a valley of an image.

Subsequently, by determining a peak and a valley of an image, the presence of a pitch frequency is detected. As shown in FIG. 20, N×3 pixel matrix M1 is formed, and D (2, 2) is designated as a current pixel. For example, when N=9, 9×3 matrix M1 is used. Within the 9×3 pixel matrix M1, small matrixes M2, M3, M4 through M(N-1) are formed. The center pixel of these matrixes M2, M3, M4 through M(N-1) is determined to be a peak when the center pixel has a larger value than the eight surrounding pixels. That is, when the following equation holds, D(2, n) is a peak. Conversely, when the center pixel has a smaller value than the surrounding pixels, the center pixel is a valley pixel.

$$[D(2,n) \geq D(1,n-1)] \& [D(2,n) \geq D(1,n)] \& [D(2,n) \geq D(1,n+1)] \&$$

$$[D(2,n) \geq D(2,n-1)] \& [D(2,n) \geq D(2,n+1)] \& [D(2,n) \geq D(3,n-1)] \&$$

$$[D(2,n) \geq D(3,n)] \& [D(2,n) \geq D(3,n+1)]$$

Conversely, when the center pixel has a smaller value than the surrounding pixels, the center pixel is a valley pixel. That is, when the following equation holds, D(2, n) is a valley.

$$[D(2,n) \leq D(1,n-1)] \& [D(2,n) \leq D(1,n)] \& [D(2,n) \leq D(1,n+1)] \&$$

$$[D(2,n) \leq D(2,n-1)] \& [D(2,n) \leq D(2,n+1)] \& [D(2,n) \leq D(3,n-1)] \&$$

$$[D(2,n) \leq D(3,n)] \& [D(2,n) \leq D(3,n+1)]$$

The above described peak and valley detections are performed by sliding the matrixes M2, M3, M4 through M(N-1) within the 9×3 matrix M1. When more than two peaks or valleys are found within the 9×3 matrix M1, the current pixel D (2, n) is determined to be a dot pattern.

The above described preferred embodiment determines an average intensity of output image data and then determines the edge amount. Although the pitch frequency is subsequently described, the average intensity detection, the edge amount detection and the pitch frequency detection are performed in parallel. When the average intensity of the output image is smaller than the predetermined value, the edges are weak, and no pitch frequency exists, a see-through back image removal process is performed on the output image data.

In processing the see-through back image removal process on the output image data, it is desirable to vary the level of the see-through back image removal depending upon the document scanned by the scanner unit 1. For example, after specifying that a document is double-sided or single-sided via operational panel 19, the process control unit 8 reads the and sends the read value to the image process unit 4 via the image data control unit 3. When an input document is specified as single-sided, the scanner 1 scans only one side. Since it is likely that the input document is single-sided, the image process unit 4 sets the variable level of the see-through back image removal process to a relatively low value. On the other hand, when an input document is specified as double-sided, the scanner 1 scans both sides. Since it is likely that the input document is double-sided, the image process unit 4 sets the variable level of the see-through back image removal process to a relatively high value. By the above described manner, by setting the variable level for the see-through back image removal process to a relatively high value, the see-through image is prevented from remaining. At the same time, an undesirable side-effect of removing information by setting the variable level of the see-through back image removal process to a relatively low value for the single-sided document is minimized.

In addition to the single-side and double-sided selection, it is also desirable to use the variable level of the see-through back image removal process based upon the image quality mode and the paper thickness of the input document. That is, the image quality mode includes a character mode and a photograph mode. The character mode is usually used. In this mode of duplication, two-sided documents are often used, and the documents to be duplicated are generally expressed in half-tone dot patterns. On the other hand, the documents to be duplicated in the photograph mode have both half-tone dot patterns and continuous gradation such as in silver halide pictures. Since in either mode, it is rare to have double-sided documents for duplication. When the image quality mode is the character mode, the see-through back image removal is strengthened to prevent the see-through back image. When the image quality mode is the photograph mode, the see-through back image removal is weakened to prevent the undesirable removal of information.

In order to separate image data from the front side and the back side, a double-sided mode is provided using a high intensity plate. When the high intensity plate is used with a highly transparent document, the light reflected off the plate suppresses a see-through back image by lighting the front side of the document from the back side. The intensity of the background on the front side thus increases.

It is to be understood, however, that even though numerous characteristics and advantages of the present invention have been set forth in the foregoing description, together with details of the structure and function of the invention, the disclosure is illustrative only, and that although changes may be made in detail, especially in matters of shape, size and arrangement of parts, as well as implementation in software, hardware, or a combination of both, the changes are within the principles of the invention to the fall extent indicated by the broad general meaning of the terms in which the appended claims are expressed.

What is claimed is:

1. A method of substantially eliminating the undesirable see-through back image problem in duplicating double-sided documents, comprising:

scanning a front side image from the double-sided document, the front side image having portions, some of the portions including an original front image and a see-through back image from a back side image;

storing at least the front side image;

determining an edge amount for each of the portions in the front side image;

separating the see-through back image from the original front image based upon the edge amount to generate a first process result;

smoothing the portions having a certain amount of the edge amount in the first process result to generate a smoothed result;

determining an average intensity level among the portions of the front side image;

determining a presence of a pitch frequency in the portions of the front side image;

further separating character portions and dot pattern portions from background in the smoothed result to leave background portions; and correcting an intensity level of the character portions, the dot pattern portions and the background portions in the first process result using a corresponding predetermined conversion function so as to substantially eliminate the see-through back image, wherein said further separating and said correcting steps are performed only when the following conditions are met, the average intensity level being below a predetermined threshold value, the edge amount being relatively small and the pitch frequency being present.

2. The method of substantially eliminating the undesirable see-through back image problem in duplicating double-sided documents according to claim 1 wherein the character portions and the dot pattern portions are further separated from the background portion based upon binarizing the smoothed result.

3. The method of substantially eliminating the undesirable see-through back image problem in duplicating double-sided documents according to claim 1 wherein the predetermined conversion function has a set of predetermined parameters for each pixel.

4. The method of substantially eliminating the undesirable see-through back image problem in duplicating double-sided documents according to claim 1 wherein the presence of the pitch frequency is determined based upon the use of a distribution Fourier transformation.

5. The method of substantially eliminating the undesirable see-through back image problem in duplicating double-sided documents according to claim 1 wherein the presence of the pitch frequency is determined based upon the use of a self correlation function.

6. The method of substantially eliminating the undesirable see-through back image problem in duplicating double-sided documents according to claim 1 wherein the presence of the pitch frequency is determined based upon the use of information on a peak and a valley of the front side image.

7. The method of substantially eliminating the undesirable see-through back image problem in duplicating double-sided documents according to claim 1 wherein said further separating and said correcting steps are performed at a set of predetermined levels based upon a user input.

8. The method of substantially eliminating the undesirable see-through back image problem in duplicating double-sided documents according to claim 1 wherein said further separating and said correcting steps are performed at a set of predetermined levels based upon an image quality level of the front side image.

9. A system for substantially eliminating the undesirable see-through back image problem in duplicating double-sided documents, comprising:
- a scanner for scanning a front side image from the double-sided document, the front side image having portions, some of the portions including an original front image and a see-through back image from a back side image;
- a memory unit connected to said scanner for storing at least the front side image;
- an edge amount determination unit connected to said memory unit for determining an edge amount for each of the portions in the front side image;
- a smoothing unit connected to said edge amount determination unit and said memory unit for smoothing the portions having a certain amount of the edge amount in the first process result to generate a smoothed result;
- a determination unit connected to said edge amount determination unit and said smoothing unit for initially separating the see-through back image from the original front image based upon the edge amount to generate a first process result, said determination unit further separating character portions and dot pattern portions from background in the smoothed result to leave background portions;
- an average intensity level determination unit connected to said memory unit for determining an average intensity level among the portions of the front side image; and
- a pitch frequency detection unit connected to said memory unit for determining a presence of a pitch frequency in the portions of the front side image,
- wherein said determination unit further separates the character portions and the dot pattern portions from the background and said correction unit corrects the intensity level only when the following conditions are met, the average intensity level being below a predetermined threshold value, the edge amount being relatively small and the pitch frequency being present, a correction unit connected to said determination unit for correcting an intensity level of the character portions, the dot pattern portions and the background portions the first process result using a predetermined conversion function so as to substantially eliminate the see-through back image.

10. The system for substantially eliminating the undesirable see-through back image problem in duplicating double-sided documents according to claim 9 wherein said determination unit further separates the character portions and the dot pattern portions from the background portion based upon binarizing the smoothed result.

11. The system for substantially eliminating the undesirable see-through back image problem in duplicating double-sided documents according to claim 9 wherein said determination unit further separates the character portions and the dot pattern portions from the background and said correction unit corrects the intensity level only when the front side image has an intensity level below a predetermined threshold value.

12. The system for substantially eliminating the undesirable see-through back image problem in duplicating double-sided documents according to claim 9 wherein the predetermined conversion function has a set of predetermined parameters for each pixel.

13. The system for substantially eliminating the undesirable see-through back image problem in duplicating double-sided documents according to claim 9 wherein said pitch frequency unit determines the presence of the pitch frequency based upon the use of a distribution Fourier transformation.

14. The system for substantially eliminating the undesirable see-through back image problem in duplicating double-sided documents according to claim 9 wherein said pitch frequency unit determines the presence of the pitch frequency based upon the use of a self correlation function.

15. The system for substantially eliminating the undesirable see-through back image problem in duplicating double-sided documents according to claim 9 wherein said pitch frequency unit determines the presence of the pitch frequency based upon the use of information on a peak and a valley of the front side image.

16. The system for substantially eliminating the undesirable see-through back image problem in duplicating double-sided documents according to claim 9 wherein said determination unit further separates the character portions and the dot pattern portions from the background and said correction unit corrects the intensity level in response to a selected one value from a set of predetermined levels based upon a user input.

17. The system for substantially eliminating the undesirable see-through back image problem in duplicating double-sided documents according to claim 9 said determination unit further separates the character portions and the dot pattern portions from the background and said correction unit corrects the intensity level in response to an image quality level of the front side image.

18. The method of substantially eliminating the undesirable see-through back image problem in duplicating double-sided documents according to claim 1 wherein the intensity level of the character portions, the dot pattern portions and the background portion is corrected using a corresponding one of the predetermined conversion functions.

* * * * *